United States Patent
Choi

(10) Patent No.: US 9,296,353 B1
(45) Date of Patent: Mar. 29, 2016

(54) REAR SEAT AIR-BAG APPARATUS FOR VEHICLE AND CONTROLLING METHOD THEREOF

(71) Applicant: Hyundai Motor Company, Seoul (KR)

(72) Inventor: Jae Ho Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/562,289

(22) Filed: Dec. 5, 2014

(30) Foreign Application Priority Data

Oct. 7, 2014 (KR) .................. 10-2014-0134688

(51) Int. Cl.
*B60R 21/207* (2006.01)
*B60R 21/233* (2006.01)
*B60R 21/2338* (2011.01)
*B60R 21/33* (2006.01)
*B60R 21/16* (2006.01)
*B60R 21/231* (2011.01)

(52) U.S. Cl.
CPC ............ *B60R 21/207* (2013.01); *B60R 21/233* (2013.01); *B60R 21/2338* (2013.01); *B60R 21/33* (2013.01); *B60R 2021/161* (2013.01); *B60R 2021/23153* (2013.01)

(58) Field of Classification Search
CPC  B60R 21/207; B60R 21/233; B60R 21/2338; B60R 21/33; B60R 2021/23153; B60R 2021/161; B60R 2021/23384
See application file for complete search history.

(56) References Cited

U.S. PATENT DOCUMENTS

| 2,834,606 | A | * | 5/1958 | Bertrand .................... 280/730.1 |
| 3,506,281 | A | * | 4/1970 | Berryman .................... 280/731 |
| 3,514,124 | A | * | 5/1970 | Richardson .................... 280/732 |
| 3,617,073 | A | * | 11/1971 | Landsman et al. ............ 280/734 |
| 3,778,083 | A | * | 12/1973 | Hamasaki .................... 280/739 |
| 3,779,577 | A | * | 12/1973 | Wilfert ....................... 280/730.1 |
| 5,324,071 | A | * | 6/1994 | Gotomyo et al. .......... 280/730.1 |
| 5,415,429 | A | * | 5/1995 | Fisher ........................... 280/741 |
| 5,435,594 | A | * | 7/1995 | Gille .......................... 280/728.2 |
| 5,738,368 | A | * | 4/1998 | Hammond et al. ......... 280/730.1 |
| 5,772,238 | A | * | 6/1998 | Breed et al. ................ 280/728.2 |
| 5,975,565 | A | * | 11/1999 | Cuevas ...................... 280/730.1 |
| 6,199,900 | B1 | * | 3/2001 | Zeigler ........................ 280/735 |
| 6,557,887 | B2 | * | 5/2003 | Wohllebe ................... 280/730.1 |
| 6,935,456 | B2 | * | 8/2005 | Korechika et al. ............ 180/268 |
| 7,862,074 | B2 | * | 1/2011 | Deng et al. ................. 280/730.1 |

(Continued)

FOREIGN PATENT DOCUMENTS

| JP | 5-310095 A | 11/1993 |
| JP | 7-117600 A | 5/1995 |

(Continued)

*Primary Examiner* — Laura Freedman
(74) *Attorney, Agent, or Firm* — Morgan, Lewis & Bockius LLP

(57) ABSTRACT

A rear seat air-bag apparatus for a vehicle may include an air-bag module including a housing provided in a front seat, an air-bag cushion provided in the housing and deployed to protect a rear seat passenger as needed, and an inflator deploying the air-bag cushion, an angle variable controlling mechanism adjusting an angle of the air-bag cushion in the case in which an angle adjustment of the air-bag cushion is required upon the deploying of the air-bag cushion, and a controlling unit adjusting an angle of the angle variable controlling mechanism as needed.

10 Claims, 4 Drawing Sheets

(56) References Cited

U.S. PATENT DOCUMENTS

| | | | |
|---|---|---|---|
| 8,398,113 B2* | 3/2013 | Choi et al. | 280/730.1 |
| 2011/0031722 A1* | 2/2011 | Baumann et al. | 280/728.1 |
| 2015/0091280 A1* | 4/2015 | Nagasawa | 280/730.1 |
| 2015/0091281 A1* | 4/2015 | Nagasawa | 280/730.1 |
| 2015/0091282 A1* | 4/2015 | Nagasawa et al. | 280/730.1 |
| 2015/0191143 A1* | 7/2015 | Faruque et al. | 280/730.2 |

FOREIGN PATENT DOCUMENTS

| | | |
|---|---|---|
| KR | 10-2007-0060569 A | 6/2007 |
| KR | 10-0778578 B1 | 11/2007 |
| KR | 10-2008-0099710 A | 11/2008 |
| KR | 10-2010-0026791 A | 3/2010 |
| KR | 10-1261465 B1 | 5/2013 |

* cited by examiner

REAR SEAT AIR-BAG APPARATUS FOR VEHICLE AND CONTROLLING METHOD THEREOF

CROSS REFERENCE TO RELATED APPLICATION

The present application claims priority to Korean Patent Application No. 10-2014-0134688, filed Oct. 7, 2014, the entire contents of which is incorporated herein for all purposes by this reference.

BACKGROUND OF THE INVENTION

1. Field of the Invention

The present invention relates to a rear seat air-bag apparatus for a vehicle capable of more safely and efficiently protecting a rear seat passenger when an air-bag mounted in a rear side of a front seat is deployed in the case in which the passenger seats on a rear seat, and a controlling method thereof.

2. Description of Related Art

In accordance with passenger protecting requirements in various situations for an air-bag of a vehicle, a plurality of air-bags are recently mounted in the vehicle.

In the case of a rear seat passenger upon an occurrence of collision of the vehicle, his or hers body is leaning to a front by a shock and collides with a front seat, thereby often causing an injury. So, according to the related art, in order to solve the above-mentioned problem, a rear seat air-bag apparatus having an air-bag module mounted in a rear surface of the front seat and allowing the rear seat passenger to be protected upon an occurrence of collision has been mounted.

However, in the case of the rear seat air-bag apparatus according to the related art, when an air-bag cushion 33 is deployed, since the air-bag cushion 33 is caught with a roof R depending on an angle of a seat back 10 of the front seat as shown in FIG. 1, or the air-bag cushion may not sufficiently surround the passenger due to an angle of the front seat, it did not more efficiently support the passenger.

Therefore, there are needs for a rear seat air-bag apparatus for a vehicle having a new structure capable of more safely and efficiently supporting the rear seat passenger regardless of the angle of the front seat back, and a controlling method thereof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a rear seat air-bag apparatus for a vehicle having a new structure capable of more safely and efficiently supporting a rear seat passenger since an angle and a volume of a deployed air-bag cushion are also varied depending on a change in an angle of a front seat back, and a controlling method thereof.

According to various aspects of the present invention, a rear seat air-bag apparatus for a vehicle may include an air-bag module including a housing provided in a front seat, an air-bag cushion provided in the housing and deployed to protect a rear seat passenger as needed, and an inflator deploying the air-bag cushion, an angle variable controlling mechanism adjusting an angle of the air-bag cushion in the case in which an angle adjustment of the air-bag cushion is required upon the deploying of the air-bag cushion, and a controlling unit adjusting an angle of the angle variable controlling mechanism as needed.

The air-bag cushion may further include an area variable device capable of increasing a volume of the air-bag cushion depending on an angle of the front seat upon the deploying of the air-bag cushion.

The air-bag cushion may include a main chamber and a variable chamber sewed on the main chamber, and the area variable device may include a tether binding the variable chamber and a cutting member cutting the tether, such that the tether binding the variable chamber may be cut by the cutting member and the variable chamber may be deployed.

The cutting member may include a squib and a cutter.

The air-bag module may be provided with inflators having one or more pressures, such that the pressures of the inflators may be selectively operated upon the deploying of the variable chamber to thereby allow the air-bag cushion to be deployed at higher pressure than when only the main chamber is deployed in a case in which the variable chamber needs to be deployed.

The inflator may adjust a deploying speed of the air-bag cushion by controlling pressure of injected air to be varied depending on whether or not the variable chamber is deployed upon the deploying of the air-bag cushion.

The angle variable controlling mechanism may be provided in a seat back and linked to a reclining upon an operation of the reclining of the seat to thereby adjust an angle of the air-bag module.

According to various aspects of the present invention, a controlling method of the rear seat air-bag apparatus for the vehicle of the present invention may include an angle checking step of checking an angle of a seat back upon sensing a collision of the vehicle and comparing an angle of the seat back which is pre-input to the controlling unit with a current angle of the seat back, and an air-bag cushion deploying step of deploying the air-bag cushion when the angle of the seat back checked in the angle checking step is within a deployable angle range of the air-bag cushion.

In the angle checking step, when the angle of the seat back corresponds to an angle out of the deployable angle range of the air-bag cushion, the controlling unit may not deploy the air-bag cushion.

When the angle of the seat back checked in the angle checking step is within the deployable angle range of the air-bag cushion and is within a predetermined range, a module angle adjusting step of adjusting an angle of the air-bag module may be performed by the controlling unit and the air-bag cushion deploying step may be then performed.

The controlling method may further include a variable chamber deploying step of additionally deploying a variable chamber provided in a main chamber by cutting a tether coupled to the air-bag module by a cutting member upon performing the air-bag cushion deploying step, when the angle of the seat back checked in the angle checking step is within the deployable angle range of the air-bag cushion and is within a predetermined range.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
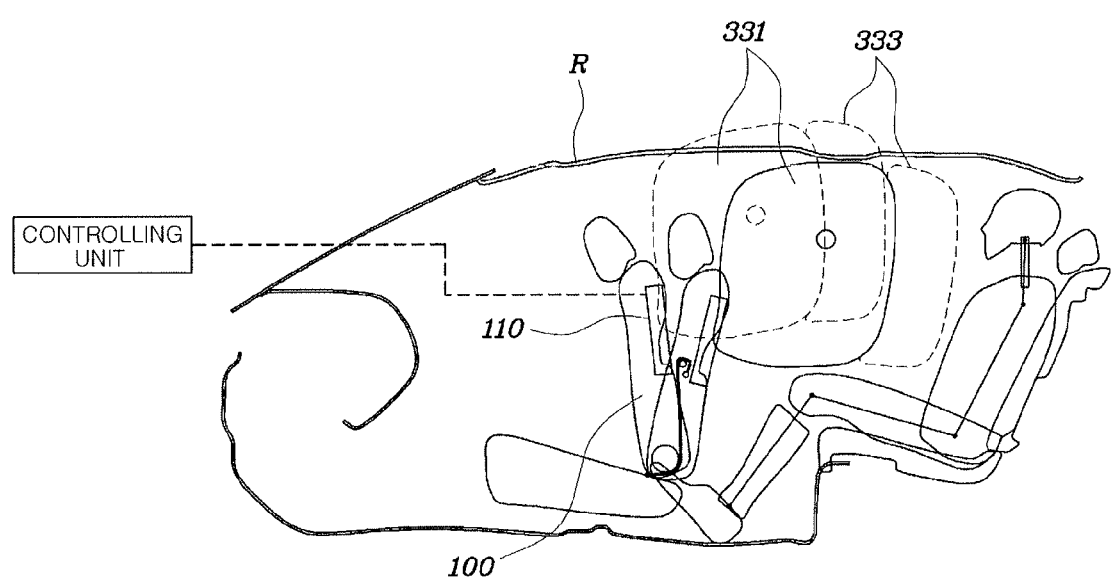
FIG. 2 is a view showing an exemplary rear seat air-bag apparatus for a vehicle according to the present invention.

FIG. 2 is a view showing a rear seat air-bag apparatus for a vehicle according to various embodiments of the present invention.

A rear seat air-bag apparatus for a vehicle according to various embodiments of the present invention includes an air-bag module 300 including a housing 110 provided in a front seat 100, an air-bag cushion 330 provided in the housing 110 and deployed to protect a rear seat passenger as needed, and an inflator deploying the air-bag cushion 330; an angle variable controlling mechanism 140 adjusting an angle of the air-bag cushion 330 in the case in which an angle adjustment of the air-bag cushion 330 is required upon the deploying of the air-bag cushion 330, and a controlling unit adjusting an angle of the angle variable controlling mechanism 140 as needed. In addition, the air-bag cushion 330 further includes an area variable device 310 capable of increasing a volume of the air-bag cushion 330 depending on an angle of the front seat 100 upon the deploying of the air-bag cushion 330.

That is, the rear seat air-bag apparatus for the vehicle has a structure in which the housing 110 is coupled to a rear surface of the front seat back 100 of the vehicle and the air-bag module 300 is coupled to the housing 110. The air-bag module 300 includes the air-bag cushion 330, the area variable device 310 and the inflator. The air-bag cushion 330 includes a main chamber 331 and a variable chamber 333 sewed on the main chamber 331, and the area variable device 310 includes a tether 311 binding the variable chamber 333 and a cutting member 313 cutting the tether 311. The inflator may be coupled to a separate inflator guide bracket (not shown). In addition, the cutting member 313 of the area variable device 310 includes a squib 313a and a cutter 313b capable of cutting the tether 311 in a short time, that is, has a structure in which the variable chamber 333 is deployed by moving the cutter 313b to the other side by explosion of the squib 313a in the case in which the angle of the seat back 100 is within a predetermined range to thereby cut the tether 311 binding the variable chamber 333.

The air-bag module 300 is provided with one or more inflators injecting air (gas) into the air-bag cushion 330. Particularly, the inflators are provided to have one or more pressures, such that the pressures of the inflators are selectively operated upon the deploying of the variable chamber, thereby making it possible to deploy the air-bag cushion 330 at high pressure or high speed. Therefore, depending on the angle of the front seat back 100, in the case in which the deploying of the variable chamber 333 is required, more number of inflators than case in which only the main chamber 331 is deployed are selectively operated, such that the air-bag cushion 330 is deployed at higher pressure or faster speed than a case in which only the main chamber 331 is deployed.

In addition, the rear seat air-bag apparatus for the vehicle has a structure adjusting a deploying speed of the air-bag cushion 330 by controlling pressure of the injected air to be varied when the deploying of the variable chamber 333 is required upon the deploying of the air-bag cushion 330 in the case in which only one inflator is configured. Therefore, in the case in which the main chamber 331 and the variable chamber 333 are deployed together with each other unlike a case in which only the main chamber 331 is deployed upon the deploying of the air-bag cushion 330, since the overall volume of the air-bag cushion 330 to be deployed is increased, the controlling unit allows the inflator to deploy the air-bag cushion 330 at higher pressure than a case in which only the main chamber 331 is deployed. Therefore, since the controlling unit controls the inflator so that all of the main chamber 331 and the variable chamber 333 may be deployed within a predetermined time without a time delay, the rear seat passenger may be more efficiently and stably protected regardless of the angle of the front seat back 100 upon the occurrence of the collision of the vehicle even when comparing with the case in which only the main chamber 331 is deployed.

That is, in the case in which only the main chamber 331 is deployed, the air-bag cushion 330 may be sufficiently deployed just by a low pressure deploying, and in the case in which the deploying of the variable chamber 333 is required together with the main chamber 331, the air-bag cushion 330 is deployed at high pressure so as to sufficiently correspond to an increased volume of the air-bag cushion 330, such that the air-bag cushion 330 is deployed in a rapid time and the passenger is protected so as not to be injured.

Figure 3:
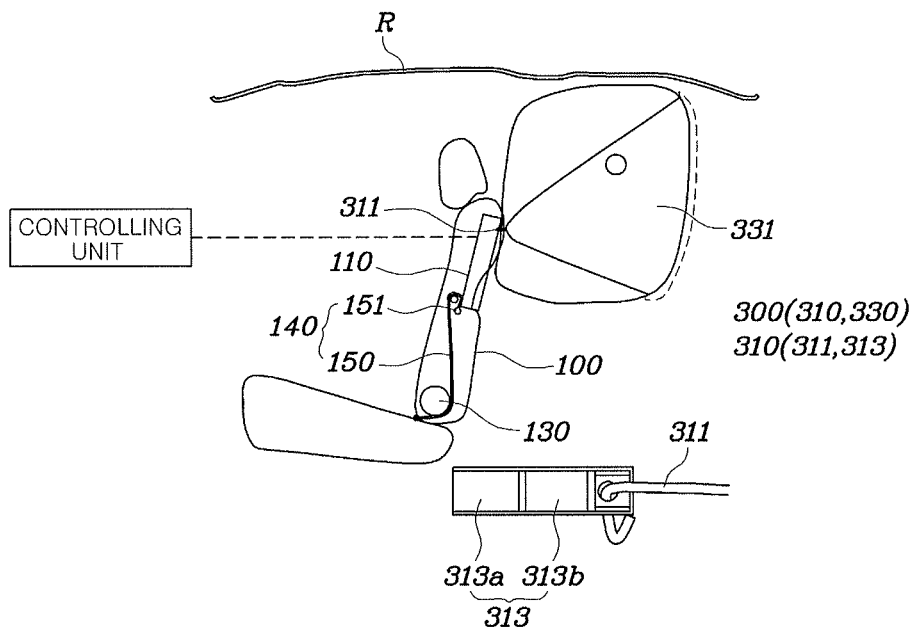
FIG. 3 and FIG. 4 are views showing operations of a variable chamber.
Figure 4:
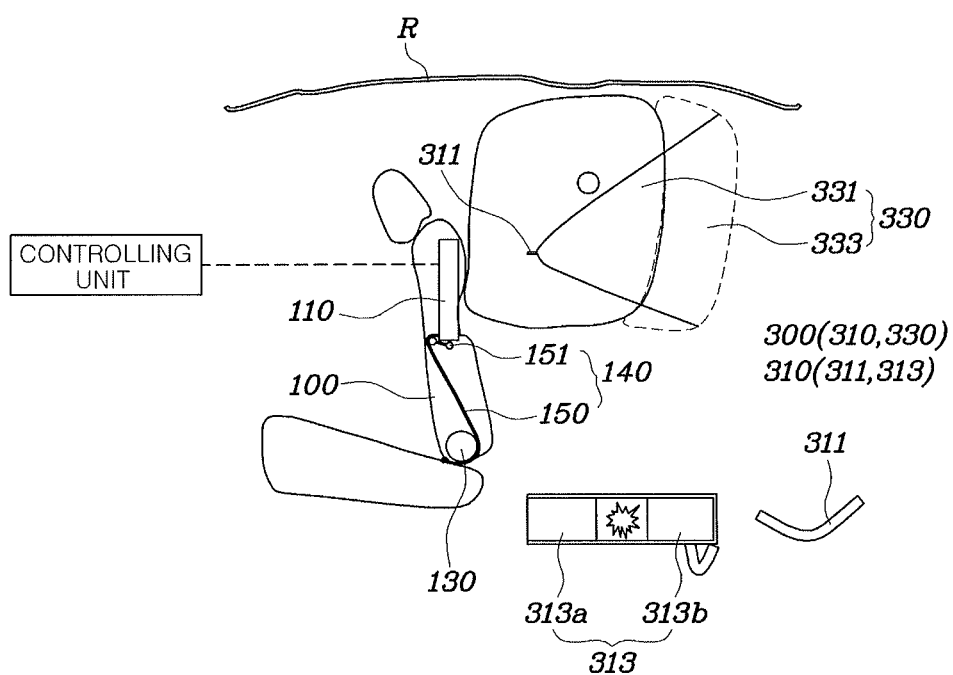

In addition, the angle variable controlling mechanism 140 has a structure provided in the seat back 100 and linked to a reclining 130 upon an operation of the reclining 130 of the seat to thereby adjust the angle of the air-bag module 300. Although the angle variable controlling mechanism 140 may be formed in various shapes and methods, various embodiments of the present invention will describe a case in which one end thereof is coupled to the reclining 130 of the seat and the other end is provided with a wire 150 coupled to the air-bag module 300 as shown in FIGS. 2 to 4 to thereby vary the angle of the air-bag module 300, by way of example.

The angle variable controlling mechanism 140 has one end coupled to the reclining 130 of the sheet and the other end coupled to the air-bag module 300, such that the air-bag module is rotated by the wire 150 linked to the reclining 130 when a user seated on the front seat adjusts the angle of the seat back 100. In addition, the wire 150 is separately provided with a rotation stopper 151 to thereby prevent the angle of the air-bag module 300 from being varied out of a limited range upon folding or deploying of the seat back 100 in front and rear directions. Although not shown in various embodiments of the present invention, the angle variable controlling mechanism 140 is separately provided with a sensing device sensing the angle of the seat back 100 and may be controlled by the controlling unit by sensing the angle of the seat back 100.

An operation of the present invention will be described in more detail with reference to the drawings. According to various embodiments, the angle of the seat back 100 of the vehicle is divided into sections and an operation of the air-bag is classified according to a range of the corresponding angle of the seat back. Therefore, the controlling unit is provided with a pre-input design reference angle and the controlling unit compares a current angle of the seat back 100 with the pre-input design reference angle. Although various embodiments of the present invention set an angle at which the user seats as the design reference angle, the design reference angle may be set based on a seat cushion in some cases and this contents may be changed in any degree according to a design or an environment.

First, in the case in which the seat back 100 is deployed in a rear direction by an angle of 10 degrees or more than the design reference angle, since this is a state in which the seat back 100 too leans back in the rear direction, it is impossible for the passenger to get on the rear seat. In addition, at an angle of 30 degrees or more than the design reference angle in a front direction, the seat back 100 is limited so as not to be folded. Therefore, the controlling unit does not operate the air-bag cushion 330 in the case in which the angle of the seat back 100 corresponds to the above-mentioned two ranges.

In addition, in the case in which the angle of the seat back 100 is folded or deployed at an angle within ±10 degrees in the front or rear direction based on the design reference angle, as can be seen in FIG. 2, only the main chamber 331 of the air-bag cushion 330 is deployed by operating the inflator in a state in which the angle of the air-bag module 300 is maintained as it is without separately performing an additionally control. These contents are shown in FIG. 2.

Figure 1:
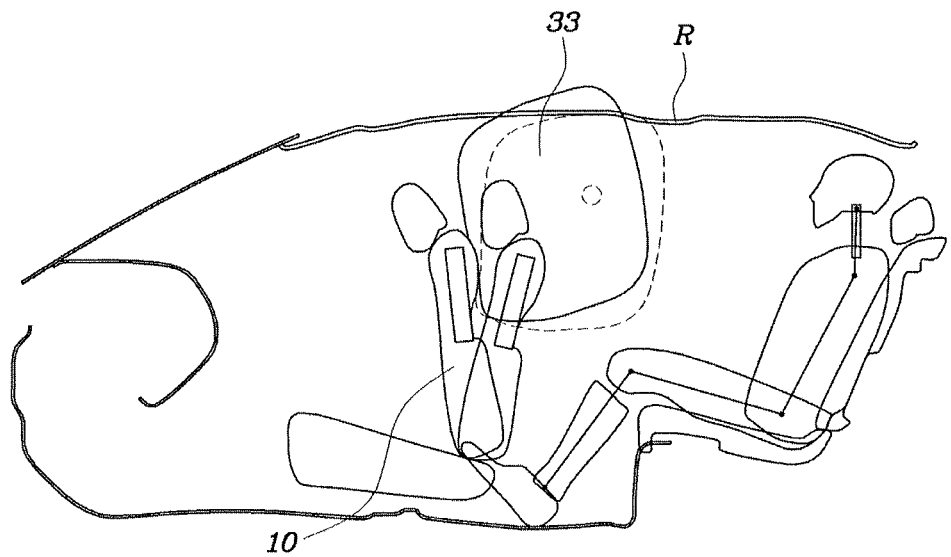
FIG. 1 is a view showing a rear seat air-bag apparatus for a vehicle according to the related art.

However, in the case in which the angle of the seat back 100 is folded or deployed at an angle between −10 degrees to −30 degrees or between −5 degrees to 15 degrees based on the design reference angle, since this corresponds to a case in which the air-bag module 300 of the seat back 100 is out of a regular range of the design reference angle, the air-bag cushion 330 is caught with a roof R of the vehicle, or the like to thereby cause interference upon the deploying of the air-bag cushion 330 as shown in FIG. 1, and as a result, the air-bag cushion 330 may not be normally deployed. Therefore, in this case, the variable chamber 333 as well as the main chamber 331 are allowed to be additionally rapidly deployed by downwardly changing the air-bag module 300 by a predetermined angle, cutting the tether 311 by the cutting member 313, and then operating the inflator, so that the air-bag cushion 330 may be normally deployed while not being interfered with a periphery.

FIG. 3 and FIG. 4 are views showing an operation of the variable chamber 333. As described above, when the angle of the seat back 100 corresponds to a predetermined range, the squib of the cutting member 313 explodes to move the cutter 313*b* to the other side, thereby cutting the tether 311. Therefore, the variable chamber 333 is deployed together with the main chamber 331 while the variable chamber 333 sewed on the main chamber 331 is broken.

Although various embodiments are described under a condition that the angle of the seat back of the front seat is checked, the present invention may be applied by checking a sliding amount of front seat, checking an angle of a rear seat, or complexly checking both of them. In addition, although various embodiments describe that the air-bag cushion is deployed by changing the angle of the air-bag module depending on the angle of the front seat as a result, the present invention may be changed so that the air-bag cushion is deployed after an angle of the inflator or an angle of the inflator guide bracket or an angle of the seat itself is changed. In addition, although the range of angle is also described as a certain example, it will be apparent to those skilled in the art that these contents may be changed in any degree according to the design or the environment.

Figure 5:
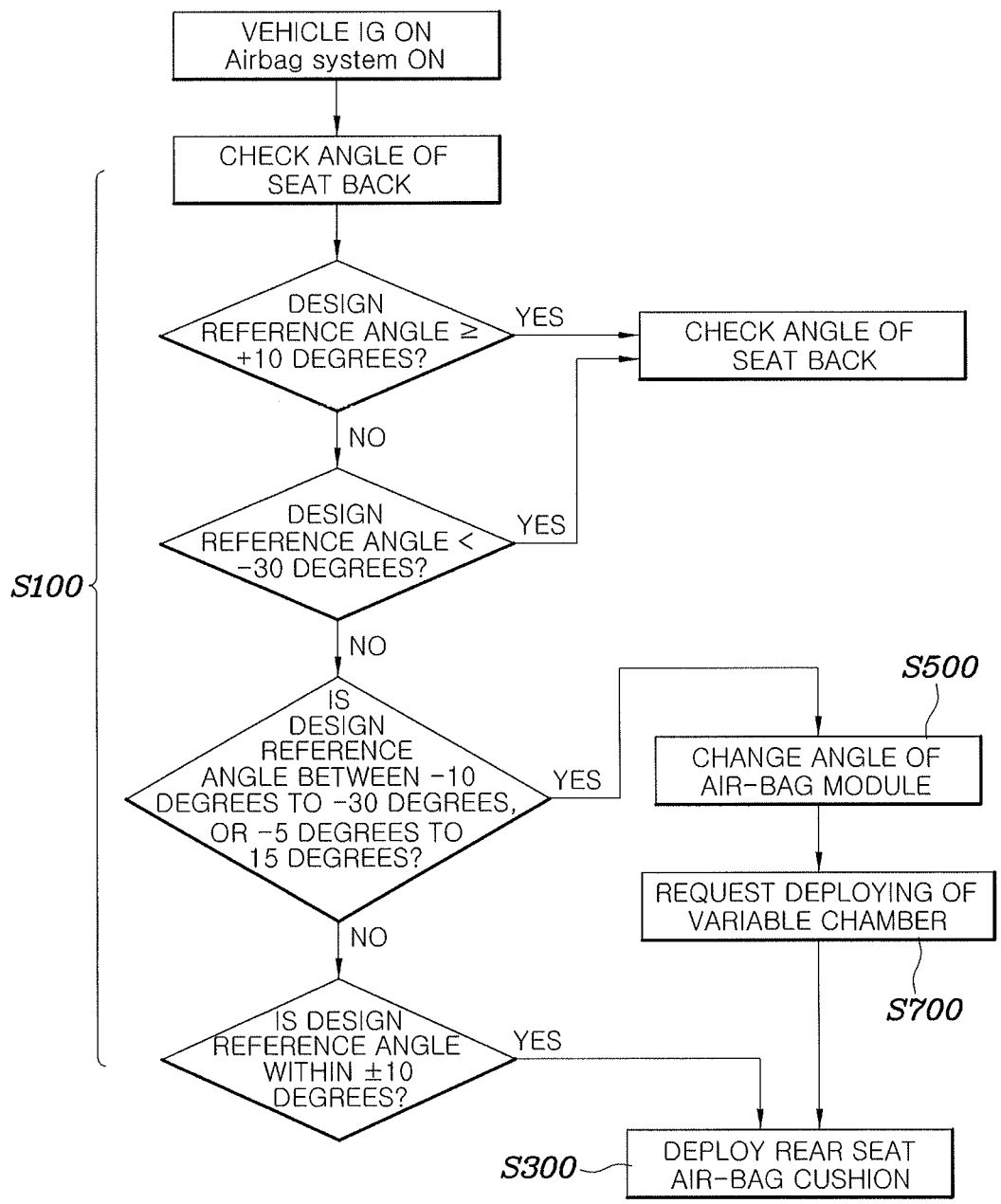
FIG. 5 is a flow chart of a controlling method of the exemplary rear seat air-bag apparatus for a vehicle according to an exemplary embodiment of the present invention.

FIG. 5 is a flow chart of a controlling method of a rear seat air-bag apparatus for a vehicle according to various embodiments of the present invention. A controlling method of the rear seat air-bag apparatus for the vehicle described above includes an angle checking step S100 of checking an angle of the seat back 100 upon sensing a collision of the vehicle and comparing an angle of the seat back 100 which is pre-input to the controlling unit with a current angle of the seat back 100; and an air-bag cushion deploying step S300 of deploying the air-bag cushion 330 if the angle of the seat back 100 in the angle checking step S100 is within a deployable angle range of the air-bag cushion 330.

In the angle checking step S100, the angle of the seat back 100 upon sensing the collision of the vehicle is checked and a design reference angle of the seat back 100 which is pre-input to the controlling unit and the current angle of the seat back 100 are compared. Therefore, if the angle of the seat back 100 checked in the angle checking step S100 is within the deployable angle range of the air-bag cushion 330, the air-bag cushion deploying step S300 deploying the air-bag cushion 330 is performed.

Therefore, if the angle of the seat back 100 is within the deployable angle range of the air-bag cushion 330 and is within a predetermined range at the same time, a module angle adjusting step S500 of adjusting an angle of an air-bag module 300 is first performed by the controlling unit and the air-bag cushion deploying step S300 is then performed. In addition, if the angle of the seat back 100 checked in the angle checking step S100 is within the deployable angle range of the air-bag cushion 330 and is within a predetermined range, a variable chamber deploying step S700 of additionally deploying a variable chamber 333 provided in a main chamber 331 by cutting a tether 311 coupled to the air-bag module 300 by a cutting member 313 upon performing the air-bag cushion deploying step S300 is performed.

Therefore, the main chamber 331 is deployed by cutting the tether 311 by the cutting member 313 upon the deploying of the air-bag cushion 330 and the variable chamber 333 is also deployed at the same time while a sewing line of the variable chamber 333 sewed on the main chamber 331 is broken. In this case, the air-bag cushion 330 is deployed at high pressure (high speed) by the inflator unlike the case in which only the main chamber 331 is deployed, such that the air-bag cushion 330 is more rapidly and stably driven, thereby making it possible to more stably support the rear seat passenger.

However, if the angle of the seat back 100 checked in the angle checking step S100 corresponds to an angle out of the deployable angle range of the air-bag cushion 330, the controlling unit does not separately instruct the air-bag cushion 330 to deploy.

According to various embodiments of the present invention, in the rear seat air-bag apparatus for the vehicle and the controlling method thereof having the above-mentioned configuration, it is possible for the air-bag cushion to more efficiently and safely support the passenger by checking the angle of the front seat back, adjusting the angle of the air-bag module depending on the angle of the corresponding seat back, or additionally deploying the variable chamber which is separately provided, upon the occurrence of the collision of the vehicle.

In addition, it is possible to implement the air-bag cushion having improved safety and reliability and to prevent the injury of the rear seat passenger by rapidly deploying the air-bag cushion upon the occurrence of the collision of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A rear seat air-bag apparatus for a vehicle, the rear seat air-bag apparatus comprising:
    an air-bag module including a housing provided in a front seat, an air-bag cushion provided in the housing and deployed to protect a rear seat passenger as needed, and an inflator deploying the air-bag cushion;
    an angle variable controlling mechanism adjusting an angle of the air-bag cushion in the case in which an angle adjustment of the air-bag cushion is required upon the deploying of the air-bag cushion; and
    a controlling unit adjusting an angle of the angle variable controlling mechanism as needed,
    wherein the angle variable controlling mechanism is provided in a seat back and linked to a reclining upon an operation of the reclining of the front seat to thereby adjust an angle of the air-bag module.

2. The rear seat air-bag apparatus of claim 1, wherein the air-bag module further includes an area variable device capable of increasing a volume of the air-bag cushion depending on an angle of the front seat upon the deploying of the air-bag cushion.

3. The rear seat air-bag apparatus of claim 2, wherein the air-bag cushion includes a main chamber and a variable chamber sewed on the main chamber, and the area variable device includes a tether binding the variable chamber and a cutting member cutting the tether, such that the tether binding the variable chamber is cut by the cutting member and the variable chamber is deployed.

4. The rear seat air-bag apparatus of claim 3, wherein the cutting member includes a squib and a cutter.

5. The rear seat air-bag apparatus of claim 3, wherein the air-bag module is provided with inflators having one or more pressures, such that the pressures of the inflators are selectively operated upon the deploying of the variable chamber to thereby allow the air-bag cushion to be deployed at higher pressure than when only the main chamber is deployed in a case in which the variable chamber needs to be deployed.

6. The rear seat air-bag apparatus of claim 3, wherein the inflator adjusts a deploying speed of the air-bag cushion by controlling pressure of injected air to be varied depending on whether or not the variable chamber is deployed upon the deploying of the air-bag cushion.

7. A controlling method of the rear seat air-bag apparatus for the vehicle of claim 1, the controlling method comprising:
    an angle checking step of checking an angle of a seat back upon sensing a collision of the vehicle and comparing an angle of the seat back which is pre-input to the controlling unit with a current angle of the seat back; and
    an air-bag cushion deploying step of deploying the air-bag cushion when the angle of the seat back checked in the angle checking step is within a deployable angle range of the air-bag cushion,
    wherein in the angle checking step, when the angle of the seat back corresponds to an angle out of the deployable angle range of the air-bag cushion, the controlling unit does not deploy the air-bag cushion.

8. A controlling method of the rear seat air-bag apparatus for the vehicle of claim 1, the controlling method comprising:
    an angle checking step of checking an angle of the seat back upon sensing a collision of the vehicle and comparing an angle of a seat back which is pre-input to the controlling unit with a current angle of the seat back; and
    an air-bag cushion deploying step of deploying the air-bag cushion when the angle of the seat back checked in the angle checking step is within a deployable angle range of the air-bag cushion,
    wherein when the angle of the seat back checked in the angle checking step is within the deployable angle range of the air-bag cushion and is within a predetermined range, a module angle adjusting step of adjusting an angle of the air-bag module is performed by the controlling unit and the air-bag cushion deploying step is then performed.

9. The controlling method of claim 8, further comprising a variable chamber deploying step of additionally deploying a variable chamber provided in a main chamber by cutting a tether coupled to the air-bag module by a cutting member upon performing the air-bag cushion deploying step, when the angle of the seat back checked in the angle checking step is within the deployable angle range of the air-bag cushion and is within a predetermined range.

10. The controlling method of claim 7, further comprising a variable chamber deploying step of additionally deploying a variable chamber provided in a main chamber by cutting a tether coupled to the air-bag module by a cutting member upon performing the air-bag cushion deploying step, when the angle of the seat back checked in the angle checking step is within the deployable angle range of the air-bag cushion and is within a predetermined range.

* * * * *